US009837905B2

(12) United States Patent
Hane

(10) Patent No.: US 9,837,905 B2
(45) Date of Patent: Dec. 5, 2017

(54) SWITCHING POWER SUPPLY CIRCUIT HAVING A SWITCHING ELEMENT AND A FREE-WHEELING ELEMENT AND ADAPTED TO TURN ON OR OFF AT LEAST THE SWITCHING ELEMENT

(71) Applicant: Torex Semiconductor Ltd., Tokyo (JP)

(72) Inventor: Norimasa Hane, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 0 days.

(21) Appl. No.: 15/298,779

(22) Filed: Oct. 20, 2016

(65) Prior Publication Data

US 2017/0117805 A1 Apr. 27, 2017

(30) Foreign Application Priority Data

Oct. 23, 2015 (JP) ................................. 2015-208868

(51) Int. Cl.
| | |
|---|---|
| *G05F 1/56* | (2006.01) |
| *H02M 3/158* | (2006.01) |
| *H02M 1/08* | (2006.01) |
| *H02M 3/156* | (2006.01) |
| *H02M 1/00* | (2006.01) |

(52) U.S. Cl.
CPC ............. *H02M 3/158* (2013.01); *H02M 1/08* (2013.01); *H02M 3/156* (2013.01); *H02M 2001/0009* (2013.01)

(58) Field of Classification Search
CPC .......... H02M 3/156; H02M 3/158; G05F 1/56
USPC ............. 363/123, 125, 147, 127, 81, 82, 84; 323/315, 282–285
See application file for complete search history.

(56) References Cited

U.S. PATENT DOCUMENTS

| 7,019,504 B2* | 3/2006 | Pullen | H02M 3/156 |
| | | | 323/283 |
| 7,107,468 B2* | 9/2006 | Pullen | H02M 3/1584 |
| | | | 323/259 |
| 2010/0019749 A1* | 1/2010 | Katsuya | H02M 1/15 |
| | | | 323/282 |
| 2017/0025952 A1* | 1/2017 | Huang | H02M 3/156 |

FOREIGN PATENT DOCUMENTS

| JP | 2010252627 A | 11/2010 |
| JP | 2011147324 A | 7/2011 |
| JP | 2011176990 A | 9/2011 |

* cited by examiner

*Primary Examiner* — Adolf Berhane
*Assistant Examiner* — Nusrat Quddus
(74) *Attorney, Agent, or Firm* — The Webb Law Firm

(57) ABSTRACT

A switching power supply circuit includes: an error amplifier for amplifying a deviation between a reference voltage and a feedback voltage; a comparator for comparing the reference voltage with an output voltage of the error amplifier, and outputting a predetermined set signal; an ON-time control circuit for defining a period during which a switching element is ON; a flip-flop circuit which is set by the set signal to bring the switching element into an ON- or OFF-state, and is reset by an output signal of the ON-time control circuit to bring the switching element into an OFF- or ON-state; a ripple voltage detection circuit for connecting an integration circuit in parallel to an inductance coil, thereby detecting a ripple voltage contained in the output voltage; and a capacitor connected between the output side of the error amplifier and a junction of a resistor and a capacitor of the integration circuit.

10 Claims, 3 Drawing Sheets

US 9,837,905 B2

SWITCHING POWER SUPPLY CIRCUIT HAVING A SWITCHING ELEMENT AND A FREE-WHEELING ELEMENT AND ADAPTED TO TURN ON OR OFF AT LEAST THE SWITCHING ELEMENT

CROSS-REFERENCE TO RELATED APPLICATION

This application claims priority to Japanese Patent Application No. 2015-208868 filed Oct. 23, 2015, the disclosure of which is hereby incorporated in its entirety by reference.

TECHNICAL FIELD

This invention relates to a switching power supply circuit and, more specifically, to that useful when applied to a DC/DC converter.

BACKGROUND ART

As a switching power supply circuit capable of high speed operation, a proposal has been made for the one configured to adjust an output voltage by turning on or off a switching element with the use of the output of a flip-flop circuit, as shown in FIG. 3. As shown in this drawing, this switching power supply circuit is equipped with a comparator 1 which compares a feedback voltage FB based on an output voltage VOUT (i.e., a voltage obtained by dividing the output voltage VOUT by a resistance ratio between the resistances of feedback resistors RFB1 and RFB2) with a reference voltage $V_{ref}$ as the output voltage of a reference power supply V0; a flip-flop circuit 2 which is set by the comparator 1; and an ON-time control circuit 3 which resets the flip-flop circuit 2 at a time when a predetermined time elapses after an output signal from the flip-flop circuit 2 has fallen. The output signal of the flip-flop circuit 2 is supplied to a main switching element (in the present example, a P-channel MOSFET) SW1 and a subordinate switching element (in the present example, an N-channel MOSFET) SW2 via a buffer circuit 4, whereby the main switching element SW1 and the subordinate switching element SW2 connected in series via a connection point $L_x$ are turned on or off by a synchronous rectification method. An input voltage VIN is applied to the input side of the main switching element SW1.

In this manner, the output voltage VOUT is obtained which is a predetermined direct current voltage smoothed by a capacitor CL via an inductance coil L connected to the connection point $L_x$.

In the above-mentioned switching power supply circuit, the feedback voltage FB and the reference voltage $V_{ref}$ are compared in the comparator 1, and the setting of the flip-flop circuit 2 is made by the output of the comparator 1, whereby the on-off control of the switching element SW is performed. If the ripple component of the output voltage VOUT is small, therefore, switching control in the flip-flop circuit 2 becomes unstable. That is, when the ripple component of the output voltage VOUT is small, the difference of the feedback voltage FB from the reference voltage $V_{ref}$ is not at a sufficient level, so that the timing for the setting of the flip-flop circuit 2 deviates from a position on a time axis at which the setting should be made. As a result, deviations are also caused to the timings of the rise and fall of a pulse signal to be supplied from an output terminal Q_B to the main switching element SW1 via the buffer circuit 4 in synchronization with the above proper timing, and to the timing of the rise of an ON-time signal to be delivered via the ON-time control circuit 3. Consequently, the output voltage VOUT shows an unstable action, such as including undulations. Such phenomena become more marked, when a capacitor with a low ESR (equivalent series resistance) is used as the capacitor CL, or when a switching frequency is raised.

In the switching power supply circuit shown in FIG. 3, an integration circuit composed of a resistor R1 and a capacitor C1 is connected in parallel with the inductance coil L to generate a voltage $V_c$ at a junction between the resistor R1 and the capacitor C1, and this voltage $V_c$ is presented as feedback to the input side of the comparator 1 via a capacitor CFB. The voltage $V_c$ has a waveform similar to a current flowing through the inductance coil L. Thus, a state equivalent to a state where the ripple component of the output voltage VOUT is sufficiently great is formed on the input side of the comparator 1. Hence, the aforementioned unstable action of the output voltage VOUT can be avoided, and the stabilization of switching operation in the flip-flop circuit 2 can be achieved, even when the ripple component of the output voltage VOUT is small.

In the switching power supply circuit shown in FIG. 3, however, the responsiveness of the circuit varies according to the amplitude of the ripple component of the output voltage VOUT. Thus, the amplitude is adjusted to be about several tens of millivolts. As a result, if the amplitude is great, a transient response will deteriorate. If the amplitude is small, by contrast, an unstable action will occur.

In order to operate this type of switching power supply circuit at a high oscillation frequency of several MHz, the speed of the comparator 1 needs to be enhanced. Thus, the problem arises that current consumption increases significantly, and because of a small DC gain, load stability lowers. Moreover, a phase shift occurs owing to a response delay of the comparator 1, and stable operation may fail to be performed.

Under these circumstances, proposals have been made, as disclosed in JP-A-2011-176990 and JP-A-2011-147324, for a switching power supply circuit which varies the reference voltage (JP-A-2011-176990), and a switching power supply circuit which detects a current flowing through a switching element in an attempt to stabilize operation (JP-A-2011-147324). Both of these switching power supply circuits, however, pose the problem that load stability deteriorates.

JP-A-2010-252627 is available for teaching a conventional technology which can speedup the operation and can improve load stability as well. In incorporating a resistor and a capacitor of a CR integration circuit into an IC as in JP-A-2010-252627, however, there is need to set the values of the resistor and the capacitor at those values which make the influence of the parasitic capacitance of the resistor negligible. However, this requires a very large layout area.

The present invention has been accomplished in the light of the above-mentioned earlier technologies. It is an object of the invention to provide a switching power supply circuit of a PFM control type which can utilize a capacitor with low ESR, such as a ceramic capacitor, for load capacity, is capable of stable operation even at an oscillation frequency of several MHz or more, obtains high load stability, and enables a layout area to be reduced.

SUMMARY OF THE INVENTION

A first aspect of the present invention for attaining the above object is a switching power supply circuit having a switching element and a free-wheeling element and adapted to turn on or off at least the switching element, thereby converting a direct current input voltage into a direct current output voltage via an inductance coil, comprising:

an error amplifier for comparing a reference voltage, which is an output signal of a reference voltage generation circuit, with a feedback voltage based on the output voltage, and amplifying a deviation between the reference voltage and the feedback voltage;

a comparator for comparing the reference voltage with an output voltage of the error amplifier, and outputting a set signal for a period when the reference voltage exceeds the output voltage of the error amplifier;

an ON-time control circuit for generating an ON-time signal being a pulse signal for defining a period during which the switching element is ON;

a flip-flop circuit which is set by the set signal to bring the switching element into an ON-state, and is reset by the ON-time signal to bring the switching element into an OFF-state;

a ripple voltage detection circuit for connecting an integration circuit, which has a first resistor and a first capacitor connected in series, to the inductance coil in parallel, thereby detecting a ripple voltage contained in the output voltage; and a second capacitor connected between a junction, which is between the first resistor and the first capacitor, and an output side of the error amplifier.

According to the present aspect, the error signal amplified by the error amplifier is inputted to the comparator. Thus, the gain can be raised, and the load stability is improved. Moreover, the integration circuit is connected in parallel to the inductance coil, so that a voltage waveform similar to the ripple voltage contained in the output voltage can be generated at the junction between the first resistor and the first capacitor. In addition, the above voltage is applied to the input side of the comparator via the second capacitor. Thus, sufficient ripple information is supplied to the comparator. As a result, unstable actions of the output voltage can be avoided.

A second aspect of the present invention is the switching power supply circuit according to the first aspect, wherein the flip-flop circuit is configured to keep the switching element in an ON-state while the set signal is persisting.

According to this aspect, the ON-state of the switching element can be continued, as long as the changed state of the set signal persists, even when the ON-time period set by the ON-time control circuit is exceeded. As a result, even if an abrupt load increase is caused, the output voltage can be smoothly converged to a target value.

A third aspect of the present invention is the switching power supply circuit according to the first or second aspect, further comprising a third capacitor having one end side connected to the output side of the error amplifier.

According to this aspect, the voltage of the integration circuit similar to the ripple voltage can be adjusted by the ratio between the capacitances of the second capacitor and the third capacitor. By such an adjustment, the above voltage can be attenuated and supplied to the comparator. As a result, the voltage of the integration circuit similar to the ripple voltage can be set at a high value, the values of the first resistor and the first capacitor can be rendered low, and their occupation areas can be decreased. Moreover, the parasitic capacitance by the first resistor can also be reduced.

A fourth aspect of the present invention is the switching power supply circuit according to the third aspect, wherein another end side of the third capacitor is connected to a side of the error amplifier where the feedback voltage based on the output voltage of the error amplifier is applied.

According to the present aspect, changes of the output terminal can be supplied from the feedback terminal to the error amplifier via the third capacitor. Thus, the phase compensation of the error amplifier can be performed satisfactorily, and the response can also be speeded up.

A fifth aspect of the present invention is the switching power supply circuit according to any one of the first to fourth aspects, wherein switch means is connected between the output side of the error amplifier and a feedback terminal where the feedback voltage based on the output voltage is applied.

According to the fifth aspect, the switch means is turned on to relieve the error amplifier from the influence of phase compensation by the first capacitor. Thus, unstable actions of the output voltage can be avoided.

A sixth aspect of the present invention is the switching power supply circuit according to the fifth aspect, wherein a second resistor is connected in series to the switch means.

According to the sixth aspect, the switch means and the second resistor are connected between the feedback terminal and the error amplifier. By turning the switch means on, therefore, a gain generated by the second resistor is added, whereby load stability can be improved.

Effects of the Invention

With the present invention, an error signal amplified by the error amplifier is inputted to the comparator, and thus the gain can be increased. Consequently, the load stability can be enhanced.

Also, the integration circuit is connected in parallel to the inductance coil, whereby a voltage waveform similar to the ripple voltage contained in the output voltage can be generated at the junction between the first resistor and the first capacitor. Moreover, the above voltage is applied to the input side of the comparator via the second capacitor. Thus, the comparator is supplied with sufficient ripple information. Consequently, unstable actions of the output voltage VOUT can be avoided.

Hence, there can be provided a switching power supply circuit of a PFM control type which can utilize a capacitor with low ESR, such as a ceramic capacitor, as load capacity, can operate stably even at an oscillation frequency of several MHz or more, obtains high load stability, and can reduce the layout area.

MODE FOR CARRYING OUT THE INVENTION

Figure 1:
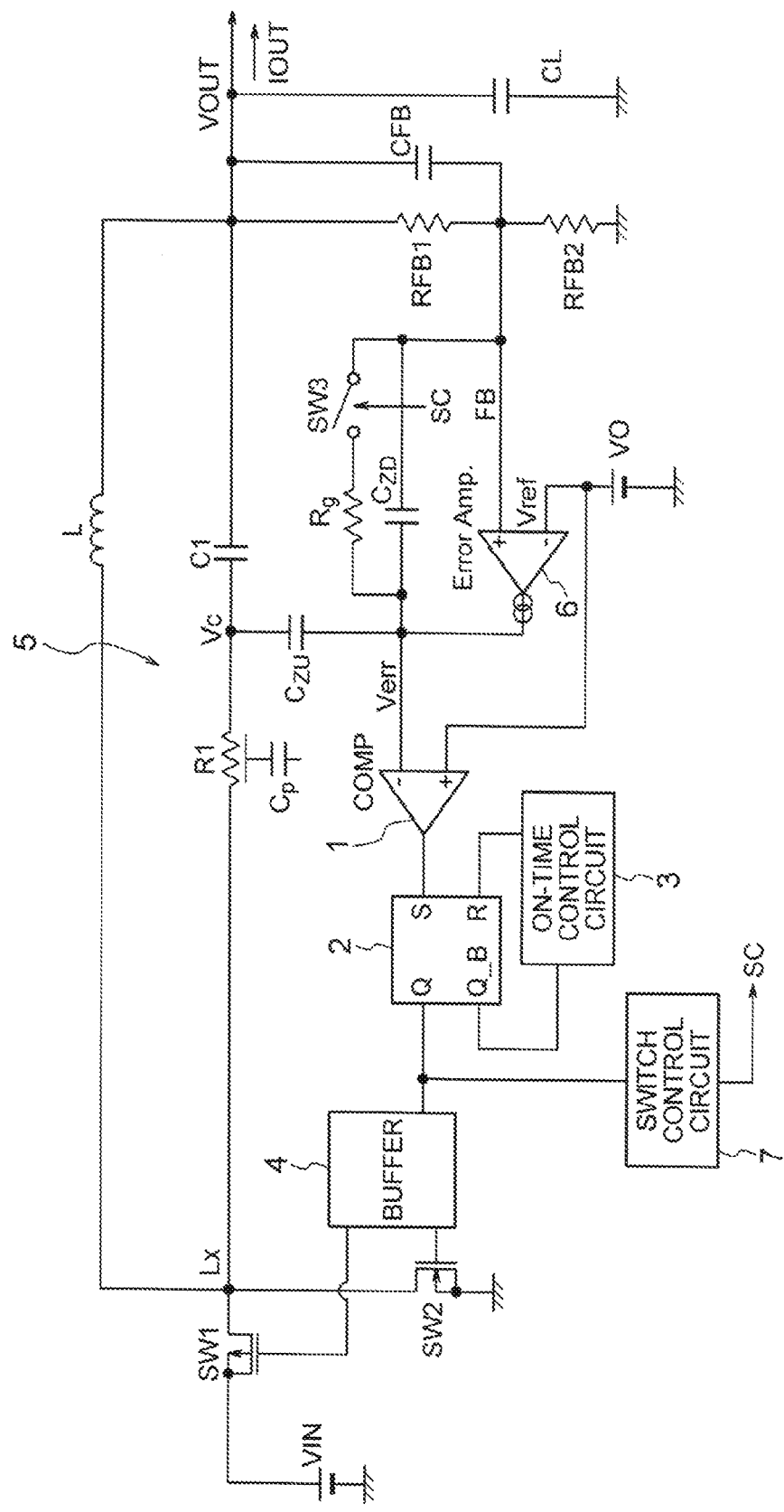
FIG. 1 is a circuit diagram showing a switching power supply circuit according to the embodiment of the present invention.

The embodiment of the present invention will now be described in detail with reference to the accompanying drawings. FIG. 1 is a circuit diagram showing the switching power supply circuit of the present invention. As shown in this drawing, the switching power supply circuit according to the present embodiment has a main switching element SW1 connected to an input power source VIN, and a subordinate switching element SW2 connected to the main switching element SW1 via a connection point Lx, and turns the main and subordinate switching elements SW1 and SW2 on or off alternately. The switching power supply circuit is a DC/DC converter in a PFM control mode which, by such a mechanism, converts a direct current input voltage into a direct current output voltage VOUT via an inductance coil L. The output voltage VOUT is smoothed by a capacitor with low ESR such as a ceramic capacitor.

A comparator 1 compares the output voltage of an error amplifier 6 with a reference voltage $V_{ref}$ outputted by a reference voltage source VO, and outputs a set signal for a period of time during which the reference voltage $V_{ref}$ exceeds the output voltage of the error amplifier 6. The error amplifier 6 compares the reference voltage $V_{ref}$ with a feedback voltage FB obtained by dividing the output voltage VOUT by a division ratio between a resistor RFB1 and a resistor RFB2, and amplifies the deviation between the reference voltage $V_{ref}$ and the feedback voltage FB.

A flip-flop circuit 2 is set by the set signal outputted by the comparator 1 to bring the main switching element SW1 and the subordinate switching element SW2 into an ON- or OFF-state via a buffer circuit 4 by a Q output thereof and, on the other hand, is reset by an ON-time signal generated by an ON-time control circuit 3. The main switching element SW1 and the subordinate switching element SW2 are synchronously controlled so that when one of them is ON, the other of them is OFF. The ON-time control circuit 3 generates the ON-time signal, which is a pulse signal rising upon a Q_B output of the flip-flop circuit 2 and persisting for a predetermined period (ON-time period $T_{on}$), and after a lapse of the ON-time period $T_{on}$, resets the flip-flop circuit 2. Thus, the ON-time control circuit 3 basically defines, by the ON-time period $T_{on}$, a period of time during which the main switching element SW1 is kept ON. In the present embodiment, however, while the set signal supplied from the comparator 1 is being held in an H-state, the Q output of the flip-flop circuit 2 is in an H-state, holding the main switching element SW1 continuously in the ON-state. Thus, a mode in which the main switching element SW1 is kept in the ON-state beyond the ON-time period $T_{on}$ is also generated. A detailed explanation for concrete actions in this connection will be presented later based on FIGS. 2(a) to 2(f).

A ripple voltage detection circuit 5 is constituted by connecting an integration circuit, which has a resistor (first resistor) R1 and a capacitor (first capacitor) C1 connected in series, to both ends of the inductance coil L in parallel. In this configuration, a voltage $V_c$ similar to a ripple voltage contained in the output voltage VOUT is obtained at a junction between the resistor R1 and the capacitor C1. A capacitor $C_{zu}$ (second capacitor) is connected between the junction of the resistor R1 and the capacitor C1, where the voltage $V_c$ is obtained, and the output side of the error amplifier 6. Furthermore, a capacitor (third capacitor) $C_{zd}$ is connected between the output side of the error amplifier 6 and the input side of the error amplifier 6, where the feedback voltage FB is applied, in parallel with the error amplifier 6.

Between the output side of the error amplifier 6 and the input side of the error amplifier 6, where the feedback voltage FB is applied, a resistor $R_g$ and a switch SW3 connected in series are connected in parallel with the capacitor $C_{zd}$. The switch SW3 has its ON/OFF state controlled by a switch control signal SC outputted by a switch control circuit 7. Based on the Q output signal of the flip-flop circuit 2, the switch control circuit 7 generates the switch control signal SC. The control operation of the switch SW3 will also be described in detail later based on FIGS. 2A to 2F.

With the switching power supply circuit according to the present embodiment in the above-described configuration, the error signal amplified by the error amplifier 6 is inputted to the comparator, so that the gain can be increased. Consequently, the load stability of the switching power supply circuit can be improved markedly.

Moreover, the integration circuit is connected in parallel with the inductance coil L so that a voltage waveform similar to the ripple voltage contained in the output voltage VOUT is generated as the voltage $V_c$ at the junction between the resistor R1 and the capacitor C1. Besides, the voltage $V_c$ is applied to the input side of the comparator 1 via the capacitor $C_{zu}$. Thus, sufficient ripple information is supplied to the comparator 1. As a result, unstable actions of the output voltage VOUT can be avoided. In the present embodiment, moreover, the capacitor $C_{zd}$ is connected between the output side of the error amplifier 6 and the input side thereof where the feedback voltage FB is applied. Thus, the voltage $V_c$ can be adjusted using the ratio between the capacitances of the capacitor $C_{zu}$ and the capacitor $C_{zd}$. By making such an adjustment, the voltage $V_c$ can be attenuated, and supplied to the comparator 1. Consequently, the voltage $V_c$ can be set at a high value, and the values of the resistor R1 and the capacitor C1 can be rendered low to decrease their occupation areas. Also, a parasitic capacitance $C_p$ by the resistor R1 can be made low.

According to the present embodiment, moreover, changes in the output voltage VOUT can be supplied to the error amplifier 6 via the feedback voltage FB and the capacitor $C_{zd}$. Thus, the phase compensation of the error amplifier 6 can be performed satisfactorily, and a quickened response can be ensured.

By turning on the switch SW3, the influence by the phase compensation of the error amplifier 6 can be warded off, and the gain produced by the resistor $R_g$ can be added to improve the load stability.

Figure 2:
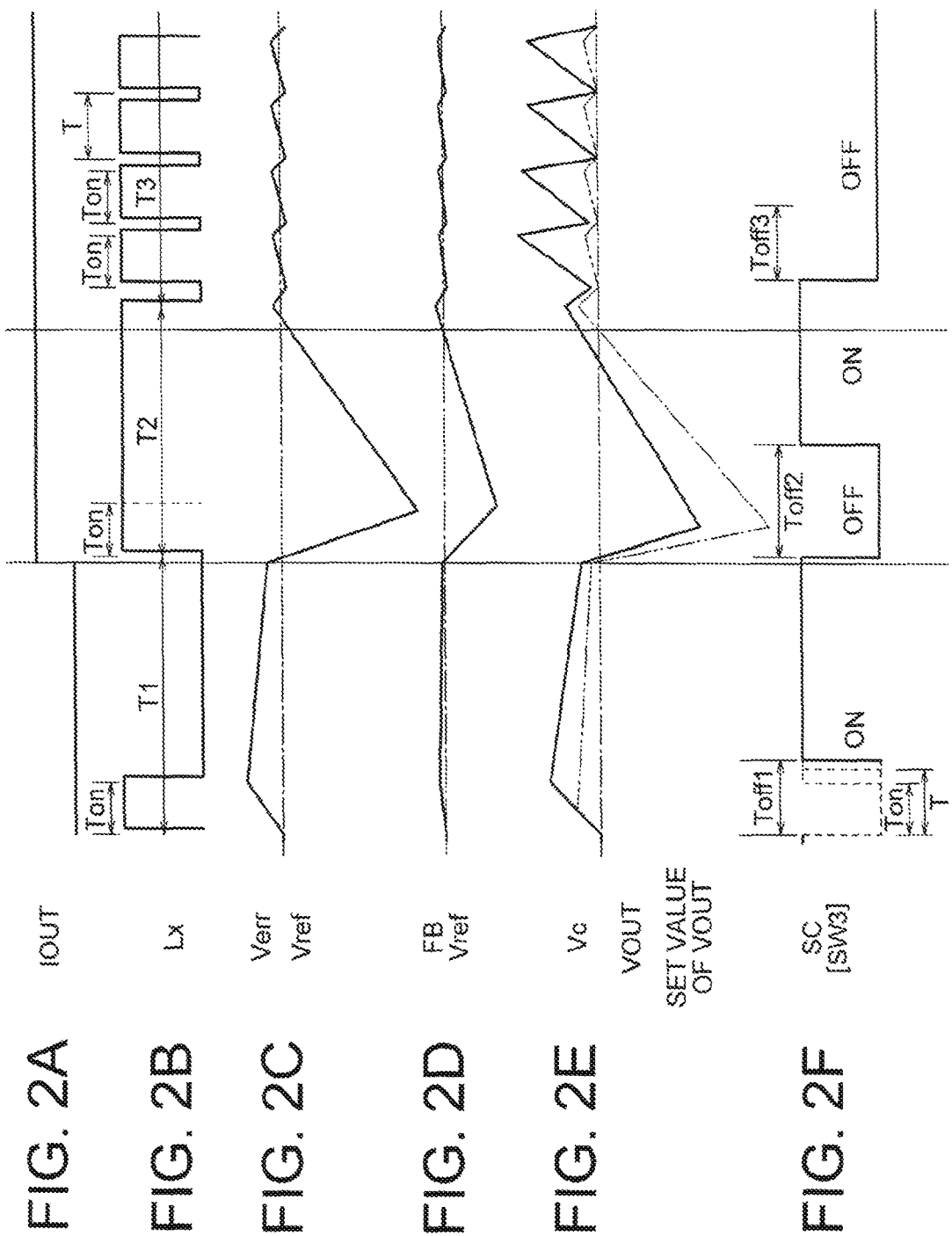
FIGS. 2A to 2F are waveform charts showing the waveforms of respective portions in FIG. 1, indicating load transient responses in a full-on state of the switching power supply circuit shown in FIG. 1.
Figure 3:
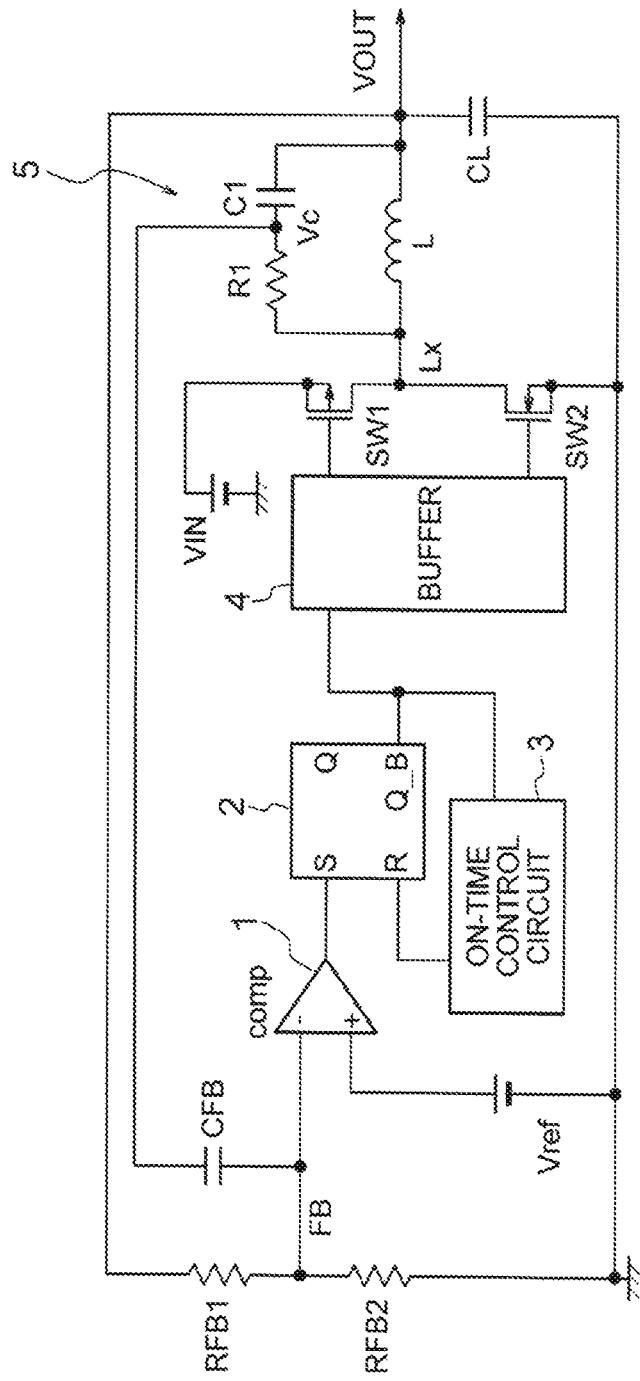
FIG. 3 is a circuit diagram showing a switching power supply circuit according to the conventional technology.

FIGS. 2A to 2F are waveform charts for the respective portions, showing load transient responses in the full-on state of the switching power supply circuit according to the present embodiment. As shown in these waveform charts, FIG. 2A indicates an output current IOUT; FIG. 2B, the voltage at the connection point $L_x$; FIG. 2C, the output signal $V_{err}$ (solid line in the drawing) of the error amplifier 6 and the reference voltage $V_{ref}$ (dashed dotted line in the drawing); FIG. 2D, the feedback voltage FB (solid line in the drawing) and the reference voltage $V_{ref}$ (dashed dotted line in the drawing); FIG. 2E, the voltage $V_c$ (solid line in the drawing) at the junction between the resistor R1 and the capacitor C1, the output voltage VOUT (dashed double-dotted line in the drawing), and the set value (dotted line in the drawing) of the output voltage VOUT; and FIG. 2F, the switch control signal SC for ON-OFF control of the switch SW3.

As shown in FIG. 2B, this example represents a waveform chart in which the voltage is in a light load period (discontinuous operation period) T1, then enters a sudden load change transient period T2 during which the switching element SW1 keeps ON for a very long term in response to a suddenly changed load, and finally comes to an ordinary continuous operation period T3. In FIG. 2B, the light load period T1 and the sudden load change transient period T2 are generated by the switch control circuit 7 based on the Q output of the flip-flop circuit 2 (having the same waveform as in FIG. 2B). That is, the light load period T1 is defined as a period during which after the pulse in the Q output persisting for the ON-time period $T_{on}$ falls, a next pulse does not occur even when the cycle T is exceeded. The sudden load change transient period T2 is defined as a period during which the pulse in the Q output persists for a long time beyond the ON-time period $T_{on}$.

As will be clear by reference to FIGS. 2B and 2F, the switch control circuit 7 basically tries to generate the switch control signal SC falling in synchronization with the timing of the rise of the Q output. However, the switch control signal cannot rise within a prohibition period $T_{off}1$ in the light load period T1, within a prohibition period $T_{off}2$ in the sudden load change transient period T2, and within a prohibition period $T_{off}3$ in the continuous operation period T3. That is, the switch SW3 does not enter the ON-state within the prohibition periods $T_{off}1$ to $T_{off}3$, but goes into the ON-state after a lapse of the prohibition periods $T_{off}1$ to $T_{off}3$. This is because after the lapse of the prohibition periods $T_{off}1$ to $T_{off}3$, warding off the influence of the phase compensation of the error amplifier 6 takes preference over obtaining a high gain. As the prohibition periods $T_{off}1$ to $T_{off}3$, any periods can be selected individually. In the present embodiment, however, ($T_{off}1$ to $T_{off}3$)>T>$T_{on}$ where T is the cycle, and the following relation holds: T={(Ton·VIN)/VOUT}. In the present embodiment, $T_{off}3$>$T_{on}$. In the continuous operation period T3, therefore, the switch SW3 is not in the ON-state.

The present invention has been described as above along with its embodiment, but is in no way limited to the above embodiment. In the embodiment, for example, the flip-flop circuit 2 controls the switching operation of the main switching element SW1 by use of its Q output, but may be adapted to control it by its Q_B output. It is to be noted, however, that when the Q output is utilized as in the above embodiment, it is possible to form a pulse persisting for a long period beyond the ON-time period $T_{on}$ in the sudden load change transient period T2.

Moreover, the subordinate switching element SW2 need not necessarily be an element having a switching function. For example, it may be a free-wheeling element such as a diode. Furthermore, the capacitor $C_{zd}$ is not necessarily needed, because the capacitor $C_{zu}$, if any, enables the voltage $V_c$, which is similar to the ripple waveform generated by the integration circuit, to be applied to the input side of the comparator 1.

The error amplifier 6 may, if necessary, be configured to be short-circuited with the switch SW3, because there is a case where even if the phase compensation function of the error amplifier 6 is always exhibited, no problem is posed.

INDUSTRIAL APPLICABILITY

The present invention can be utilized effectively in industrial fields where various power supply circuits of semiconductor equipment are produced and marketed.

EXPLANATIONS OF LETTERS OR NUMERALS

1 Comparator
2 Flip-flop circuit
3 ON-time control circuit
4 Buffer circuit
5 Ripple voltage detection circuit
6 Error amplifier
7 Switch control circuit
SW1 Main switching element
SW2 Subordinate switching element
SW3 Switch
R1 Resistor (first)
$R_g$ Resistor (second)
C1 Capacitor (first)
$C_{zu}$ Capacitor (second)
$C_{zd}$ Capacitor (third)
$V_c$ Voltage
FB Feedback voltage
$V_{ref}$ Reference voltage
VIN Input power source
V0 Reference voltage source
VOUT Output voltage
IOUT Output current

The invention claimed is:

1. A switching power supply circuit having a switching element and a free-wheeling element and adapted to turn on or off at least the switching element, thereby converting a direct current input voltage into a direct current output voltage via an inductance coil, comprising:
    an error amplifier for comparing a reference voltage, which is an output signal of a reference voltage generation circuit and is supplied to an inverted input terminal, with a feedback voltage which is a voltage based on the output voltage and is supplied to a non-inverted input terminal, and amplifying a deviation between the reference voltage and the feedback voltage;
    a comparator for comparing the reference voltage with an output voltage of the error amplifier, and outputting a set signal for a period during which the reference voltage exceeds the output voltage of the error amplifier;
    an ON-time control circuit for generating an ON-time signal being a pulse signal for defining a period during which the switching element is ON;
    a flip-flop circuit which is set by the set signal to bring the switching element into an ON-state, and is reset by the ON-time signal to bring the switching element into an OFF-state;
    a ripple voltage detection circuit for connecting an integration circuit, which has a first resistor and a first capacitor connected in series, to the inductance coil in parallel, thereby detecting a ripple voltage contained in the output voltage; and
    a second capacitor connected between a junction, which is between the first resistor and the first capacitor, and an output side of the error amplifier.

2. The switching power supply circuit according to claim 1, wherein the flip-flop circuit is configured to keep the switching element in the ON-state while the set signal is persisting.

3. The switching power supply circuit according to claim 1, further comprising a third capacitor having one end side connected to the output side of the error amplifier.

4. The switching power supply circuit according to claim 3, wherein another end side of the third capacitor is connected to a side of the error amplifier where the feedback voltage based on the output voltage of the error amplifier is applied.

5. The switching power supply circuit according to claim 1, wherein switch means is connected between the output side of the error amplifier and a feedback terminal where the feedback voltage based on the output voltage is applied.

6. The switching power supply circuit according to claim 5, wherein a second resistor is connected in series to the switch means.

7. The switching power supply circuit according to claim 2, further comprising a third capacitor having one end side connected to the output side of the error amplifier.

8. The switching power supply circuit according to claim 2, wherein switch means is connected between the output side of the error amplifier and a feedback terminal where the feedback voltage based on the output voltage is applied.

9. The switching power supply circuit according to claim 3, wherein switch means is connected between the output side of the error amplifier and a feedback terminal where the feedback voltage based on the output voltage is applied.

10. The switching power supply circuit according to claim 4, wherein switch means is connected between the output side of the error amplifier and a feedback terminal where the feedback voltage based on the output voltage is applied.

* * * * *